(12) United States Patent
Vemuri

(10) Patent No.: US 10,412,066 B1
(45) Date of Patent: Sep. 10, 2019

(54) HIERARCHICAL INPUT/OUTPUT FENCING IN CLUSTERED ENVIRONMENTS

(71) Applicant: Veritas Technologies LLC, Mountain View, CA (US)

(72) Inventor: Hari Krishna Vemuri, Maharashtra (IN)

(73) Assignee: Veritas Technologies LLC, Santa Clara, CA (US)

(*) Notice: Subject to any disclaimer, the term of this patent is extended or adjusted under 35 U.S.C. 154(b) by 271 days.

(21) Appl. No.: 15/420,287

(22) Filed: Jan. 31, 2017

(51) Int. Cl.
*G06F 21/00* (2013.01)
*H04L 29/06* (2006.01)
*G06F 9/455* (2018.01)

(52) U.S. Cl.
CPC ........ *H04L 63/061* (2013.01); *G06F 9/45558* (2013.01); *G06F 2009/45583* (2013.01)

(58) Field of Classification Search
CPC ............... H04L 63/061; G06F 9/45558; G06F 2009/45583
See application file for complete search history.

(56) References Cited

U.S. PATENT DOCUMENTS

| | | | | |
|---|---|---|---|---|
| 7,313,636 B2* | 12/2007 | Qi | .......................... | G06F 13/387 710/33 |
| 7,631,066 B1* | 12/2009 | Schatz | .................. | G06F 9/5016 709/224 |
| 8,024,432 B1* | 9/2011 | Sharma | ................. | G06F 9/5061 709/203 |
| 2012/0311122 A1* | 12/2012 | Johnsen | ................ | H04L 9/3234 709/223 |

OTHER PUBLICATIONS

Herr, Anthony. Symantec Cluster Server 6.2 I/O Fencing Deployment Considerations (Year: 2014).*

* cited by examiner

*Primary Examiner* — Kendall Dolly
(74) *Attorney, Agent, or Firm* — Campbell Stephenson LLP

(57) ABSTRACT

Disclosed herein are methods, systems, and processes to perform hierarchical fencing in clustered environments. A first set of registration keys is received from a first set of nodes that are supported by a first hypervisor and are part of a cluster. A first key value is generated based on the first set of registration keys. The first key value is then stored on a shared storage device shared by the first set of nodes and a second set of nodes supported by a second hypervisor. Upon receiving a request to perform an input/output (I/O) fencing operation, the first key value is modified and the second key value is removed from the shared storage device.

21 Claims, 9 Drawing Sheets

300

| Persistent Reservation Operations Table 305 | | | |
|---|---|---|---|
| Event Field 310 | Description Field 315 | Key Value 140(1) Field 320 | Key Value 140(2) Field 325 |
| Initial state | No active nodes in cluster 105 | <empty> | <empty> |
| Node 110(1) joins on hypervisor 120(1) | First node in cluster 105; no other nodes present | 10000000 | <empty> |
| Node 110(2) joins on hypervisor 120(1) | Second node in cluster 105 but on same hypervisor; update key | 11000000 | <empty> |
| Node 110(5) joins on hypervisor 120(2) | Third node in cluster 105; causes registration of key value 140(2) from hypervisor 120(2) (with bits for nodes 110(1) and 110(2) added) and removal of key value 140(1) of hypervisor 120(1) to trigger hypervisor 120(1) to note change in cluster membership | <empty> | 11001000 |
| Hypervisor 120(1) updates itself | Hypervisor 120(1) receives I/O error; checks for change in cluster membership and re-registers with updated key value | 11001000 | 11001000 |
| Node 110(5) decides to evict node 110(2) | Node 110(5) removes bit of node 110(2) on hypervisor 120(2); hypervisor 120(2) in turn updates key value 140(2) and evicts key value 140(1) of hypervisor 120(1) | <empty> | 10001000 |
| Hypervisor 120(1) updates itself | Hypervisor 120(1) receives an I/O error; checks for change in cluster membership, stops permitting I/Os for node 110(2) and re-registers with updated key value | 10001000 | 10001000 |
| Node 110(5) moves from hypervisor 120(2) to hypervisor 120(1) | Hypervisor 120(1) detects node 110(5) and since node 110(5) is a valid member, permits I/Os for node 110(5); hypervisor 120(2) detects that node 110(5) has moved and updates it's internal state without requiring change in registration as node 110(5) is still a valid member | 10001000 | 10001000 |

FIG. 3

HIERARCHICAL INPUT/OUTPUT FENCING IN CLUSTERED ENVIRONMENTS

FIELD OF THE DISCLOSURE

This disclosure relates to distributed storage and computer systems. In particular, this disclosure relates to hierarchical input/output (I/O) fencing in clustered environments.

DESCRIPTION OF THE RELATED ART

A cluster is a distributed computer system with several nodes (e.g., computing devices such as virtual machines, and the like) that work together as a single entity to provide processing power and storage resources. Input/output (I/O) fencing (or more simply, fencing) refers to the process of isolating a node (e.g., a virtual machine) of a cluster, and/or protecting shared resources of the cluster when the node malfunctions (or appears to malfunction). The failed node may have control over shared resource(s) such as shared storage used (and required) by the other nodes in the cluster.

A cluster must be capable of taking corrective action when a node fails (as noted above). However, data corruption can occur, for example, if two nodes in different sub-clusters or network partitions (of the cluster) attempt to take control of shared storage in an uncoordinated manner. Fencing can be used to either disable the failed node, or disallow access to shared storage, thus ensuring data integrity and preventing data corruption. Therefore, fencing can be used to prevent uncoordinated access to shared storage.

Persistent reservations (PRs) can be used to perform fencing. Persistent reservations enables access for multiple nodes to a storage device, and simultaneously blocks access to the storage device for other nodes. Unfortunately, currently it is not possible to perform persistent reservations-based fencing for multiple nodes of a cluster operating on a single host (e.g., multiple nodes running on a single hypervisor).

SUMMARY OF THE DISCLOSURE

Disclosed herein are methods, systems, and processes to perform hierarchical fencing in clustered environments. One such method involves receiving a first set of registration keys from a first set of nodes that are part of a cluster and supported by a first hypervisor, generating a first key value based on the first set of registration keys, and storing the first key value on a shared storage device shared by the first set of nodes and a second set of nodes supported by a second hypervisor. The method also receives a request to perform an input/output (I/O) fencing operation, and in response to receiving the request to perform the I/O fencing operation, modifies the first key value and removes a second key value associated with the second hypervisor from the shared storage device.

In certain embodiments, the method determines that a node that is part of the second set of nodes has joined the cluster, and determines that the joining has caused storing of the second key value on the shared storage device and removal of the first key value from the shared storage device. The method also determines that a node that is subject to the I/O fencing operation is part of the first set of nodes, and based on determining that the node is part of the first set of nodes, performs one or more persistent reservation operations on the node. If the node that is subject to the I/O fencing operation is part of the second set of nodes, the method removes the second key value from the shared storage device.

In certain other embodiments, the persistent reservation operations include at least a register operation, an unregister operation, a reserve operation, or a preempt operation, and the shared storage device is a Small Computer System Interface 3 (SCSI-3) disk. In these examples, the first hypervisor and the second hypervisor access a Logical Unit Number (LUN) on the SCSI-3 disk as part of performing the persistent reservation operation(s).

In some embodiments, the first hypervisor and the second hypervisor implement a first hierarchical fencing engine and a second hierarchical fencing engine, respectively. In this example, the first key value corresponds to one or more nodes executing on the first hypervisor. The first hypervisor registers and/or stores the first key value on the shared storage device.

In other embodiments, the second key value stored by the second hypervisor on the shared storage device is a combination of a bit wise OR of one or more existing nodes in the cluster and one or more nodes executing on the second hypervisor. In this example, the second hypervisor removes the first key value associated with the first hypervisor from the shared storage device, and the removal of the first key value indicates to the first hypervisor that the cluster has changed.

In certain embodiments, the first hypervisor is configured to cause the second hypervisor to update the second key value by updating the first key value and revoking the second key value. In certain other embodiments, the second hypervisor is configured to cause the first hypervisor to update the first key value by updating the second key value and revoking the first value. In one embodiment, a node from the first set of nodes migrates from the first hypervisor to the second hypervisor, and in another embodiment another node from the second set of nodes migrates from the second hypervisor to the first hypervisor.

The foregoing is a summary and thus contains, by necessity, simplifications, generalizations and omissions of detail; consequently those skilled in the art will appreciate that the summary is illustrative only and is not intended to be in any limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

FIG. 3 is a table 300 illustrating persistent reservation operations in a cluster, according to one embodiment of the present disclosure.

Figure 1:
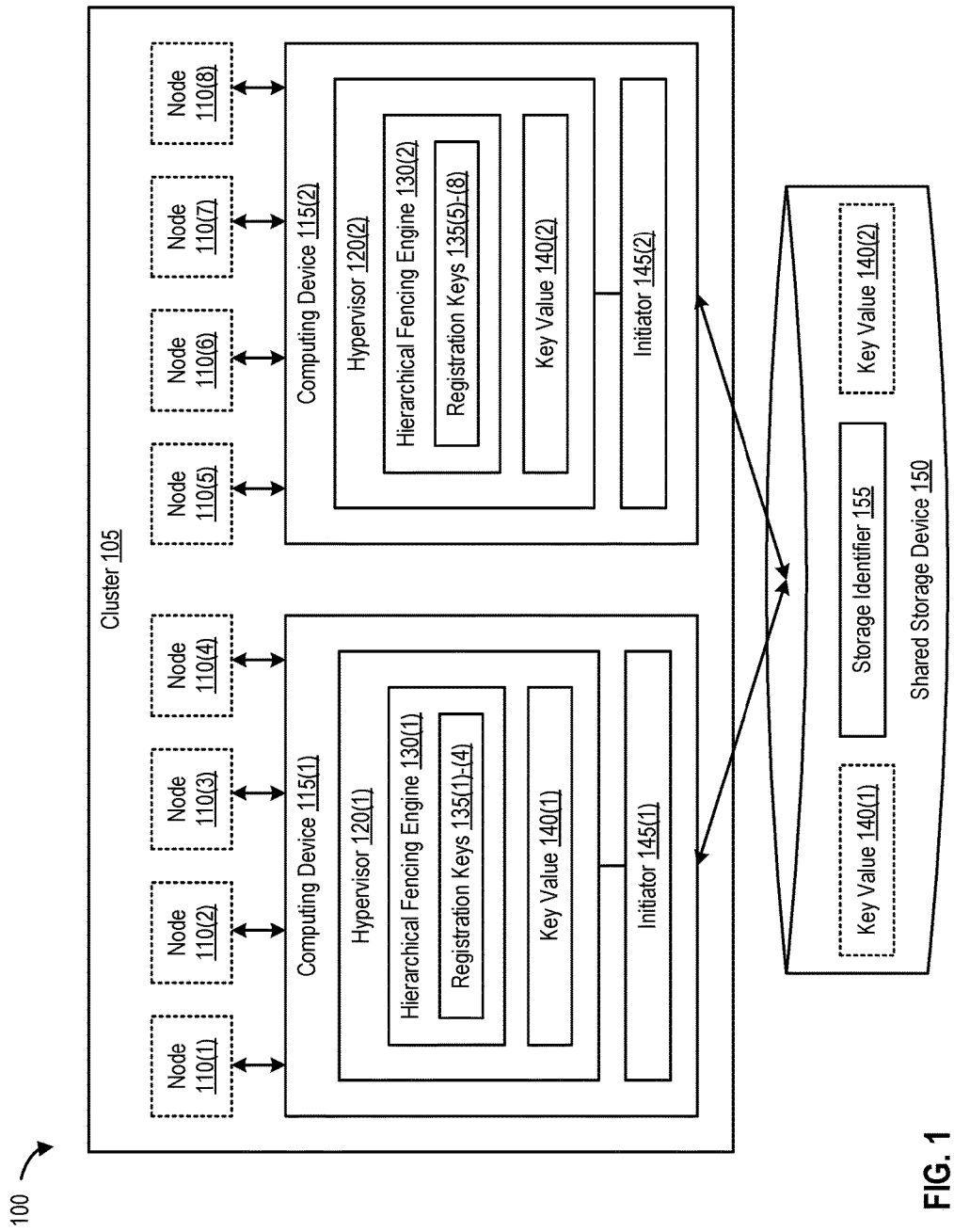
FIG. 1 is a block diagram 100 of a computing system that performs hierarchical fencing in clustered environments, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

A cluster is a distributed computer system with several nodes (e.g., computing devices such as virtual machines, and the like) that work together as a single entity to provide processing power and storage resources. In a cluster, the processing load of the computer system is typically spread over more than one computer (or node), thereby eliminating (or minimizing) single points of failure. Therefore, applications and/or programs executing on the cluster can continue to function despite a problem with one computer (or node) in the cluster.

Because modern businesses, companies, and/or organizations increasingly rely on complex computer systems (e.g., distributed storage and/or computing systems) for their daily operations, managing the vast amount of data generated and processed by applications executing on such computer systems is a significant challenge. To efficiently manage data in distributed storage and/or computing systems, Storage Area Networks (SANs) including many different types of storage devices can be implemented. SANs provide a variety of topologies and capabilities for interconnecting storage devices, subsystems, and server systems. For example, a variety of interconnect entities, such as switches, hubs, and bridges, can be used to interconnect these components.

As previously noted, a cluster includes multiple interconnected computers that appear as one computer to end users and applications. Each interconnected computer in the cluster is called a node. One example of a node is a virtual machine. The combined processing power of multiple nodes can provide greater throughput and scalability than is available from a single node. In high-availability clusters, multiple nodes can execute instances of the same application and/or instances of different applications. These nodes can share a storage device for the purpose of data storage, replication and/or deduplication. A shared storage disk/device (e.g., a Cluster Shared Volume (CSV)) can be made accessible for read and write operations by various nodes and applications within a cluster. Each cluster can have multiple CSVs.

In Flexible Shared Storage (FSS) systems, multiple nodes in a cluster share one or more CSVs. Thus, FSS systems enable cluster-wide network sharing of local storage (e.g., in the form of Direct Attached Storage (DAS), internal disk drives, and the like). Also as previously noted, the network sharing of storage can be enabled through the use of a network interconnect among the nodes of the cluster. This feature allows network shared storage to co-exist with physically shared storage. Therefore, distributed storage systems can be implemented in a multi-node cluster to provide to high-availability of data from one or more storage devices.

Example of Input/Output (I/O) Fencing

Input/output (I/O) fencing (or more simply, fencing) refers to the process of isolating a node of a cluster, and/or protecting shared resources of the cluster when the node malfunctions (or appears to malfunction). If a cluster has multiple nodes, there is a likelihood that one of the nodes may fail at some point. The failed node may have control over shared resource(s) such as shared storage used (and required) by the other nodes in the cluster.

A cluster must be capable of taking corrective action when a node fails (as noted above). However, data corruption can occur, for example, if two nodes in different sub-clusters or network partitions (of the cluster) attempt to take control of shared storage in an uncoordinated manner. Fencing can be used to either disable the failed node, or disallow access to shared storage, thus ensuring data integrity and preventing data corruption. Therefore, fencing can be used to prevent uncoordinated access to shared storage.

A partitioned cluster can experience an "application split-brain" condition that can be caused by uncoordinated access to data by various instances of an application that are executing on separate sub-clusters of the partitioned cluster. For example, if a cluster is partitioned into two separate network partitions, two instance of the same application (e.g., instances A and B of an application) running on the two separate network partitions can cause an application-induced split-brain condition because each instance of the application can attempt to take control of shared storage in an uncoordinated manner, thus giving rise to a risk of data corruption.

For example, if a cluster is configured for a failover operation with an application instance executing on a first node, and another instance of the application executing on a second node existing in the cluster is to takeover for the first node should it fail, then complete failure of a network would lead the second node to conclude that the first node has failed. The another instance of the application executing on the second node then begins operations even though the first node has not in fact failed. Thus, the potential exists for the instance of the application executing on the first node and the other instance of the application executing on the second node to attempt to write data to the same portion (or area) of one of the storage devices in the distributed storage system thereby causing data corruption. The traditional solution is to ensure that one of the nodes cannot access the shared storage, and as noted above, fencing can be implemented to "fence off" the node from the shared storage.

In the event that communication between the nodes fails, such as when a portion of the network fails during a network partition, each of two or more sub-clusters of nodes can determine that the other sub-cluster of nodes has failed (or might have failed). For example, a race (also called a "fencing race") can occur between the two (or more) sub-clusters of nodes, with control modules of each sub-cluster of nodes determining that the other sub-cluster of nodes is malfunctioning.

As previously noted, an instance of an application executing on node(s) in a first sub-cluster (or network partition) can perform data writes to the storage device(s), while another instance of the application executing on node(s) in the other sub-cluster (or other network partition) can also perform data writes to the same portion(s) of the shared storage devices, resulting in data inconsistency errors. In order to prevent these data inconsistency errors, an "arbitration process" is performed that determines winner and loser sub-clusters (or groups).

Nodes in the winner sub-cluster are determined to keep communicating with the shared storage, whereas nodes in the loser sub-cluster are determined to stop communicating with these shared storage devices. However, nodes in the winner sub-cluster do not determine if or when nodes in the loser sub-cluster(s) will conclude that they have lost arbitration (and thus desist from using the shared storage devices). Thus, in addition to this arbitration process, the control module of the winner sub-cluster of node(s) can perform a fencing process that fences nodes from the loser sub-cluster(s) from the rest of the distributed storage system. The fencing process is performed to ensure that nodes from the loser sub-cluster(s) do not communicate with the storage devices, as improper data writes from the loser nodes would cause various data inconsistency and other errors.

Generally, fencing can be performed in two stages. In the first stage, fencing attempts to fence out the loser sub-cluster(s) of nodes. The loser nodes can be notified about the outcome of the arbitration and/or about the fencing process being implemented. Such notification can include the control module(s) of the loser sub-cluster of nodes discovering that the loser sub-cluster lost the arbitration process, the control module(s) of the loser sub-cluster of nodes encountering communication errors that indicate loss of communication, and/or communication from the loser nodes being disabled, among others.

In the second stage, fencing removes loser nodes' access to the storage devices, such as by instructing the shared storage devices (that are accessible to the winner sub-cluster) to not accept any communication from the loser nodes. In this case, even if the control module(s) of the winner sub-cluster of nodes cannot ensure that loser sub-cluster(s) of nodes are no longer performing data writes to the shared storage devices (such as by executing instance(s) of a shared application), the loser nodes will not be able to access/modify application data being used by winner nodes. In effect, this fencing mechanism prevents a portion of the cluster from accessing the shared storage devices in an uncoordinated manner.

Example of Persistent Reservation-Based Fencing

Persistent reservations (PRs) can be used to perform fencing and resolve the issues of using reservations, for example, in a clustered SAN environment. For example, Small Computer System Interface-PR (e.g., SCSI-3 PR) enables access for multiple nodes to a storage device, and simultaneously blocks access to the storage device for other nodes. SCSI-3 reservations are persistent across SCSI bus resets (e.g., of a Host Bus Adaptor (HBA)) and support multiple paths from a host (e.g., a hypervisor) to a disk (e.g., a SCSI-3 compliant disk).

SCSI-3 PR uses registration and reservation to perform I/O fencing. Each system (e.g., a host) registers its own "key" with a SCSI-3 device (e.g., a shared storage device). Multiple host systems registering keys form a membership and establish a reservation, typically set to "Write Exclusive Registrations Only" (WERO). The WERO setting enables only registered host systems to perform write operations. For a given disk, only one reservation can exist amidst numerous registrations.

In SCSI-3 PR-based fencing, write access can be blocked by removing (or ejecting) a registration from a shared storage device. Only registered nodes can "eject" the registration of another node. A node wishing to eject another node can issue a "preempt and abort" command. Ejecting a node is final and atomic; an ejected node cannot eject another node. In clustered environments, a node registers the same key for all paths to the shared storage device. Therefore, a single preempt and abort command can be used to eject a node from all paths to the shared storage device.

Unfortunately, implementing SCSI-3 PR based fencing in clustered environments requires individual nodes of a cluster to run on different hosts (e.g., hypervisors) and also requires the mapping of the shared storage device directly in physical Raw Device Mapping (RDM) mode. Because SCSI-3 PR works based on an initiator identification (initiator ID) that is shared between multiple nodes (e.g., virtual machines) on a given host (e.g., a hypervisor), SCSI-3 PR-based fencing cannot be currently implemented in such clustered environments.

As previously noted, and as will be appreciated, fencing can be implemented to provide protection against data corruption caused by split-brain. In clustered environments, multiple compute instances communicate with each other and coordinate access to shared storage. In order to prevent data corruption, for example, because of network partition, disruption, and the like, fencing can be implemented to permit only a legitimate set of users, nodes, virtual machines, and/or compute instances, and the like, to access a shared storage device. SCSI-3 PR-based fencing can be provided by the shared storage device to ensure that only legitimate initiators can access a given shared storage device, for example, by using a reservation mechanism that verifies a legitimate initiator's key value.

The verification of an initiator's key value can be performed on a per input/output (I/O) basis (e.g., for every write operation that is sent to a shared storage device), and the key values can be maintained on the shared storage device. For example, fencing can be implemented for multiple virtual machines running on the same physical machine (e.g., a physical frame) that share the same physical hardware (e.g., a Host Bus Adaptor (HBA) or an "initiator"). The key value that is registered on the shared storage device is a representation of the initiator. The key value is mapped to the initiator, and the initiator, which is a physical entity, is shared by multiple virtual machines running on a single host (e.g., a hypervisor). Unfortunately, in such scenarios, the shared storage device is not able to identify the virtual machine or node that sends commands to the shared storage device. Therefore, the identity of the virtual machine or node is lost.

In addition, in certain clustered environments, only a single virtual machine or node can be identified on a physical frame for the purposes of SCSI-3 PR-based fencing. Multiple virtual machines or nodes cannot be identified on a given physical frame for the purposes of SCSI-3 PR-based fencing because currently there is no mechanism to identify such virtual machines or nodes as separate entities. For example, certain hypervisors use a mechanism called Raw Device Mapping (RDM). RDM permits a physical device such as a shared storage device to be exposed directly to virtual machines or nodes executing on a given hypervisor (e.g., using device pass through). Because SCSI-3 PR-based fencing requires each node or virtual machine to register a key on a shared storage device to be considered a legitimate user of the shared storage device, only one node or virtual machine per host is permitted registration on the shared storage device. Therefore, because the shared storage device can permit only one virtual machine or node on a physical frame to act as a legitimate user of the shared storage device, a given storage identifier on the shared storage device possesses no mechanism for determining the identities of multiple nodes or multiple virtual machines executing on a given host.

One solution in such situations has been to implement Coordination Point (CPs) (e.g., in the form of a coordination point server (CP server)). CPs can be implemented in a cluster to assist with fencing operations. CPs provide a lock mechanism to determine which node (or nodes) are allowed to fence off shared storage (e.g., data drives) from other nodes in the cluster. For example, and as noted above, a node must eject the registration key of a peer node from a coordination point before that node is allowed to fence the peer node from shared storage. In this manner, CPs can keep track of the various nodes that are operating in the cluster. However, CPs suffer from one or more shortcomings when implemented in situations involving "split-brain."

"Split-brain" refers to a situation where the availability of data (e.g., from shared storage) is inconsistent due to the maintenance of two separate data sets that overlap in scope. For example, such overlap can occur because of a network partition where two or more sub-clusters (of a cluster) are unable to communicate and synchronize their respective data sets. The data sets of each sub-cluster may randomly serve clients by their own idiosyncratic data set updates, without coordination with other data sets from other sub-clusters. Therefore, when a split-brain condition occurs in a cluster, the decision of which sub-part of the cluster should continue to operate (called an arbitration process, or simply arbitration) can be made by implementing fencing operations using CPs, as noted above.

Unfortunately, CPs cannot entirely ensure that the fenced node (evicted node) will become a foreign node and will not issue any I/O operations because CPs merely function as a tracking mechanism—a CP server may not have the capability to prevent I/O operations from a given node, although it is fenced off, for example, as part of a fencing operation. In addition, there is also the risk that the fenced off node may negatively affect a cluster's configuration; stray I/Os do not permit "tight" I/O fencing.

Therefore, it will be appreciated that it is desirable to perform I/O fencing (e.g., SCSI-3 PR-based fencing) for multiple nodes of a cluster running on a single host (e.g., a single hypervisor), while preventing I/O operations from a fenced off node (e.g., fencing operations performed on a per node basis while maintaining access to other nodes on the same host), and to preserve the identity and state of a given node, if that node is migrated from one host to another host in the cluster. Disclosed herein are methods, systems, and processes to perform hierarchical I/O fencing in clustered environments.

Example Computing System to Perform Hierarchical I/O Fencing

FIG. 1 is a block diagram 100 of a computing system that performs hierarchical fencing in clustered environments, according to one embodiment. As shown in FIG. 1, cluster 105 includes several nodes (e.g., eight nodes; nodes 110(1)-(8)) as well as several computing devices (e.g., two physical frames; computing devices 115(1) and 155(2)). Each computing device implements a hypervisor. For example, computing device 115(1) implements hypervisor 120(1) and computing device 115(2) implements hypervisor 120(2). Although only eight nodes and two computing devices are shown in FIG. 1, cluster 105 can include multiple nodes, multiple computing devices, and multiple hypervisor.

Each computing device in cluster 105 includes an initiator. For example, computing device 115(1) includes initiator 145(1) and computing device 115(2) includes initiator 145(2). In certain embodiments, initiators 145(1) and 145(2) are devices such as HBAs (e.g., host controllers or host adapters), and the like. As shown in FIG. 1, hypervisor 120(1) implements hierarchical fencing engine 130(1). Hierarchical fencing engine 130(1) receives registration keys 135(1)-(4) from nodes 110(1)-(4), and maintains and stores registration keys 135(1)-(4). Hierarchical fencing engine 130(1) also generates a key value 140(1) based, in part, on registration keys 135(1)-(4). Based on the number of nodes supported by hypervisor 120(1) and/or computing device 115(1), hierarchical fencing engine 130(1) can receive, maintain, and store multiple registration keys.

Similarly, and according to certain embodiments, hypervisor 120(2) implements hierarchical fencing engine 130(2). Hierarchical fencing engine 130(2) receives registration keys 135(5)-(8) from nodes 110(5)-(8), and maintains and stores registration keys 135(5)-(8). Hierarchical fencing engine 130(2) also generates a key value 140(2) based, in part, on registration keys 135(5)-(8). Based on the number of nodes supported by hypervisor 120(2) and/or computing device 115(2), hierarchical fencing engine 130(2) can receive, maintain, and store multiple registration keys. In some embodiments, nodes 110(1)-(8) are virtual machines, and key values 140(1) and 140(2) are bitmaps.

Computing devices 115(1) and 115(2) are communicatively coupled to a shared storage device 150. Shared storage device 150 can be any type of storage device that is shared at least by computing devices 115(1) and 115(2). Shared storage device 150 includes a storage identifier 155, and stores key values 140(1) and 140(2). In certain embodiments, storage identifier 155 is a Logical Unit Number (LUN) that is part of persistent reservation operations performed in cluster 105.

As previously noted, it is desirable to provide protection against data corruption in clustered environments that shared storage, particularly during split-brain conditions by performing I/O fencing (e.g., by executing SCSI-3 PR commands that determine whether a given SCSI initiator (e.g., initiator 145(1)) can access a given storage shared device (e.g., shared storage device 150(1)) using a certain key value (e.g., key value 140(1)) and reservation). Also as previously noted, it possible to provide nodes with direct access to a shared storage device (e.g., using RDM), however because a given SCSI initiator (e.g., initiator 145(1)) is typically shared by multiple virtual machines (e.g., nodes 110(1)-(4)), the identity of a given virtual machine (e.g., node 110(2)) is lost when using PR-based fencing.

In addition, as previously noted, it will also be appreciated that PR-based fencing solutions encounter restrictions where only one node of a cluster per physical host can be recognized (e.g., by a storage identifier such as a LUN). Stand-by hosts are not effective in these situations because they do not have a pre-existing node (e.g., a virtual machine) that is already part of the cluster. What's more, CP server-based fencing can provide arbitration to address split-brain conditions, but cannot meet the requirements associated with tight data disk I/O fencing.

Figure 2:
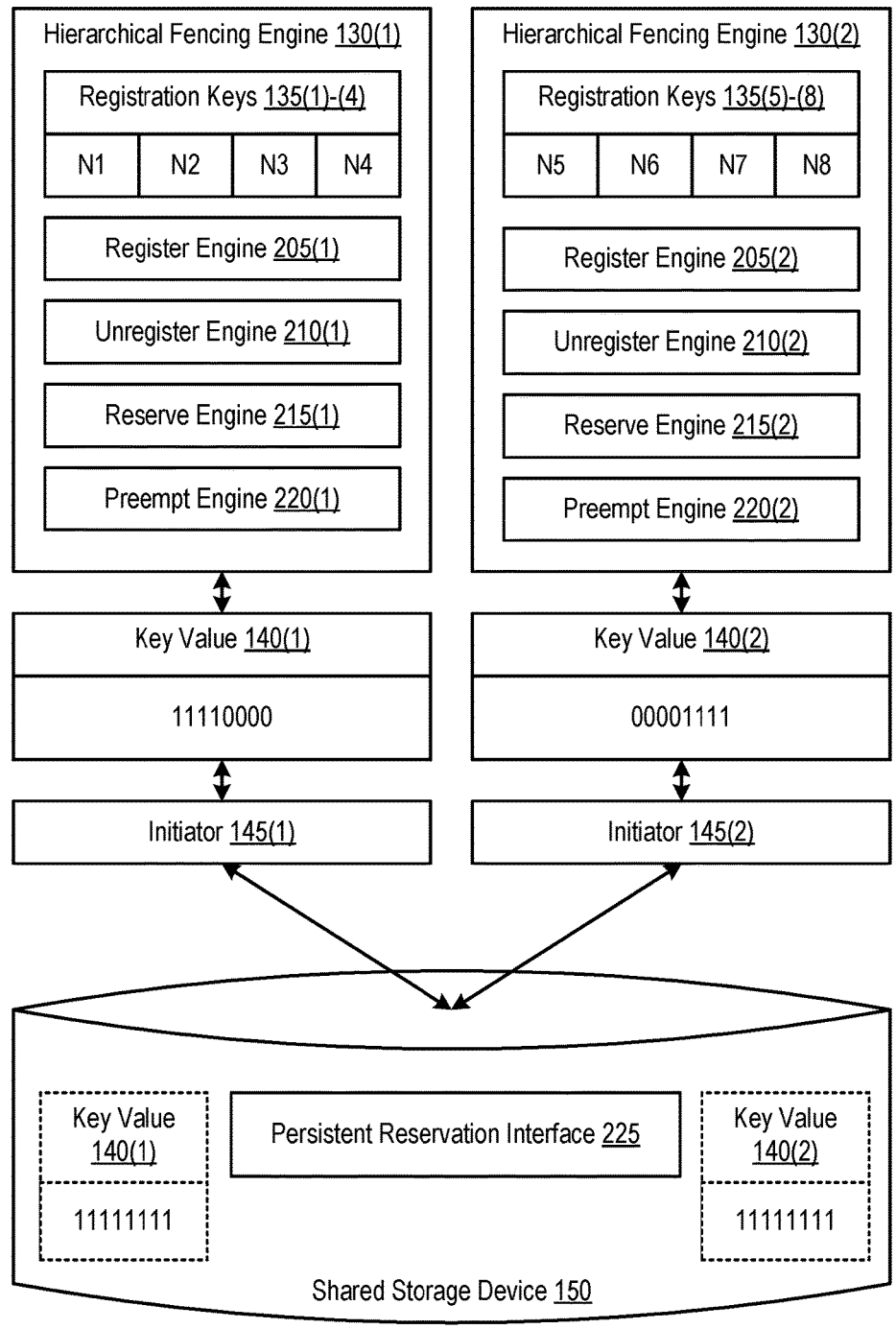
FIG. 2 is a block diagram 200 of hierarchical fencing engines implemented on different hosts in a cluster, according to one embodiment of the present disclosure.

FIG. 2 is a block diagram 200 of hierarchical fencing engines 130(1) and 130(2) implemented on different hosts in cluster 105, according to one embodiment. Hierarchical fencing engines 130(1) and 130(2) can be configured to provide tight data disk I/O fencing in clustered environments. In certain embodiments, hierarchical fencing engines 130(1) and 130(2) perform dynamic multipathing (DMP) to balance I/Os across multiple paths from computing devices 115(1) and 155(2), respectively, to shared storage device 150.

As shown in FIG. 2, hierarchical fencing engine 130(1) receives, maintains, and stores registration keys 135(1)-(4) (e.g., N1, N2, N3, and N4). N1 is registration key 135(1) received from node 110(1), N2 is registration key 135(2) received from node 110(2), N3 is registration key 135(3) received from node 110(3), and N4 is registration key 135(4) received from node 110(4). Registration keys 135(1)-(4) (shown in FIG. 2 as N1, N2, N3, and N4) uniquely identify nodes 110(1)-(4) because nodes 110(1)-(4) each register themselves with hierarchical fencing engine 130(1) (e.g., when some or all of nodes 110(1)-(4) join cluster 105). Hierarchical fencing engine 130(1) also implements at least a register engine 205(1), an unregister engine 210(1), a reserve engine 215(1), and a preempt engine 220(1) to perform persistent reservation operations.

Similarly, hierarchical fencing engine 130(2) receives, maintains, and stores registration keys 135(5)-(8) (e.g., N5, N5, N7, and N8). N5 is registration key 135(5) received from node 110(5), N6 is registration key 135(6) received from node 110(6), N7 is registration key 135(7) received from node 110(7), and N8 is registration key 135(8) received from node 110(8). Registration keys 135(5)-(8) (shown in FIG. 2 as N5, N6, N7, and N8) uniquely identify nodes 110(5)-(8) because nodes 110(5)-(8) each register themselves with hierarchical fencing engine 130(2) (e.g., when some or all of nodes 110(5)-(8) join cluster 105). It will be appreciated that hierarchical fencing engine 130(2) also implements at least a register engine 205(2), an unregister engine 210(2), a reserve engine 215(2), and a preempt engine 220(2) to perform persistent reservation operations.

In some embodiments, hierarchical fencing engines 130(1) and 130(2) each perform persistent reservation operations (e.g., registration, un-registration, reservation, preemption, and the like) across nodes (e.g., virtual machines) running and/or executing on the same host, and accessing the same storage identifier (e.g., storage identifier 155). For example, hierarchical fencing engine 130(2) performs persistent reservation operations for nodes 110(1)-(4) supported by hypervisor 120(1), and hierarchical fencing engine 130(2) performs persistent reservation operations for nodes 110(5)-(8) supported by hypervisor 120(2), and hierarchical fencing engines 130(1) and 130(2) both access storage identifier 155.

In other embodiments, and particularly of nodes executing across hosts, hierarchical fencing engines 130(1) and 130(2) coordinate persistent reservation operations with each other using persistent reservation on the backing storage identifier (e.g., a backing LUN), and each register a key value (e.g., a bitmap) of node identifications (e.g., node IDs) of nodes that each one is controlling. Hierarchical fencing engines 130(1) and 130(2) also detect node arrival/departure and/or I/O fencing commands, modify their key value(s), and notify each other of changes in resultant cluster membership using persistent reservation preemption on the storage identifier (e.g., SCSI-3 PR preemption on the backing LUN using persistent reservation interface 225 as shown in FIG. 2). It will be appreciated that although as shown in FIG. 2, key values 140(1) and 140(2) are 8-bit key values (e.g., 11110000 and 00001111), key values 140(1) and 140(2) can be greater than 8 bits. For example, and depending on the number of virtual machines supported by each hypervisor, key values 140(1) and 140(2) can be 64-bit key values.

Hierarchical fencing engines 130(1) and 130(2) can be each configured to perform the registration of nodes with a storage identifier (e.g., using key values 140(1) and 140(2) respectively) while nodes 110(1)-(4) and nodes 110(5)-(8) register themselves with hierarchical fencing engines 130(1) and 130(2), respectively. Hierarchical fencing engine 130(1) performs persistent reservation operations of at least register/unregister/reserve/preempt among nodes 110(1)-(4) running on hypervisor 120(1) and accessing storage identifier 155, and hierarchical fencing engines 130(2) performs persistent reservation operations of at least register/unregister/reserve/preempt among nodes 110(5)-(8) running on hypervisor 120(2) and also accessing storage identifier 155.

For nodes (e.g., virtual machines) executing across hosts (e.g., across at least hypervisors 120(1) and 120(2)), hierarchical fencing engines 130(1) and 130(2) communicate and coordinate with each other using PR registration/reservation on storage identifier 155 (e.g., to address split-brain conditions and/or node migration situations). Hierarchical fencing engine 130(1) registers itself by generating and storing key value 140(1) containing node IDs hierarchical fencing engines 130(1) is controlling as part of a first persistent reservation key (e.g., a first bitmap—1110000) on shared storage device 150. Similarly, hierarchical fencing engine 130(2) registers itself by generating and storing key value 140(2) containing node IDs hierarchical fencing engines 130(2) is controlling as part of a second persistent reservation key (e.g., a second bitmap—00001111) on shared storage device 150. In some embodiments, hierarchical fencing engine 130(1) detects node arrival and/or departure from cluster 105, and modifies key value 140(1), and notifies hierarchical fencing engine 130(2) of this modification (or update) via storage identifier 155 by clearing the registration of other nodes. These other nodes receive the notification about these changes to cluster membership via reservation conflict error and re-register a key value with new information (e.g., information regarding new nodes that may have joined cluster 105).

Detection of node arrival and/or departure from cluster 105 by hierarchical fencing engine 130(1) as discussed above includes the situation where hypervisor 120(2) registers with shared storage device 150 for the first time and evicts key value 140(1) of hypervisor 120(1) after updating a (second) bitmap (e.g., key value 140(2)) with the nodes that are associated with hypervisor 120(2). For example, if hypervisor 120(1) joins cluster 105 first with two nodes, then key value 140(1) (e.g., a bitmap) is 11000000.

Subsequently, if hypervisor 120(2) joins cluster 105 with just one node, then hypervisor 120(2) registers with shared storage device 150 by storing a (second) bitmap with 11001000 (e.g., key value 140(2)) and removes (e.g., evicts, ejects, and the like) key value 140(1) associated with hypervisor 120(1) from shard storage device 150. Hypervisor 120(1) is triggered by and/or notified of this removal/eviction/ejection of key value 140(1) and updates key value 140(1) and again registers with shard storage device 150 by storing a (first) bitmap with 11001000. In this situation, and according to certain embodiments, both hierarchical fencing engines 130(1) and 130(2) have the same and/or identical key values stored on shared storage device 150.

At this point in time, key values 140(1) and 140(2) of hierarchical fencing engines 130(1) and 130(2), respectively, each denote cluster membership of cluster 105 according to hierarchical fencing engines 130(1) and 130(2), respectively. If cluster membership of cluster 105 changes as a result of new nodes joining cluster 105 or nodes being fenced out of cluster 105, hierarchical fencing engines 130(1) and/or 130(2) each reform their memberships in cluster 105 by updating their respectively key values and notify each other (and other such hierarchical fencing engines) of this modification and/or update to the key values. For I/O fencing requests across hosts (e.g., hypervisors), initiators 145(1) and/or 145(2) clear the (existing) reservation, and hierarchical fencing engines 130(1) and 130(2) update their respective key values by removing the bit for the node that is (or being) fenced out. The target host (e.g., the hypervisor whose node is subject to the fencing operation) then performs hierarchical I/O fencing by blocking I/Os from the fenced off node.

Examples of Performing Persistent Reservation Operations

FIG. 3 is a table 300 that illustrates persistent reservation operations in cluster 105, according to one embodiment. As shown in FIG. 3, persistent reservation operations table 305 includes at least an event filed 310, a description field 315, a key value 140(1) field 320, and a key value 140(2) field 325. Persistent reservation operations table 305 illustrates some examples of persistent reservation operations that can be performed in clustered environments.

In one embodiment, if the initial state of cluster 105 indicates that there are no active nodes operating, running, and/or executing in cluster 105, key values 140(1) and 140(2) are both <empty> (e.g., there are no key values registered with storage identifier 155 on shared storage device 150). In another embodiment, if node 110(1) joins cluster 105 on hypervisor 120(1), node 110(1) becomes the first node to join cluster 105 (e.g., there are no other nodes other than node 110(1) present in cluster 105). In this case, hierarchical fencing engine 130(1) registers key value 140 (1) (e.g., 10000000). Similarly, if node 110(2) joints cluster 105 on hypervisor 120(1), node 110(2) becomes the second node in cluster 105—but on the same hypervisor (e.g., hypervisor 120(1)). In this case, hierarchical fencing engine 130(1) simply modifies and/or updates key value 140(1) from 10000000 to 11000000.

In some embodiments, if node 110(5) then joins cluster 105 on hypervisor 120(2), node 110(5) becomes the third node in cluster 105. The joining of node 110(5) on hypervisor 120(2) at this juncture causes hierarchical fencing engine 130(2) to register key value 140(2) from hypervisor 120(2) with bits for nodes 110(1) and 110(2) added (e.g., 11001000), and remove key value 140(1) of hypervisor 120(1) (e.g., <empty>) from shared storage device 150 to trigger hypervisor 120(1) to note a change in cluster membership.

In other embodiments, after being triggered by and/or notified of the removal of key value 140(1) from shared storage device 150, hypervisor 120(1) updates itself (e.g., because hypervisor 120(1) receives an I/O error from shared storage device 150 as only I/Os from node 110(5) are allowed/permitted and I/Os from nodes 110(1) and 110(2) are blocked) by checking for a change in cluster membership, and re-registering with storage identifier 155 on shared storage device 150 with an (updated and/or modified) key value 140(1) (e.g., 11001000). Key value 140(1) remains up-to-date (e.g., 11001000). Now, at this point in cluster membership, if node 110(5) decides to evict node 110(2), node 110(5) removes the bit of node 110(2) on hypervisor 120(2). Hypervisor 120(2) (e.g., hierarchical fencing engine 130(2)) in turn updates key value 140(2) (e.g., 10001000—showing the removed bit of node 110(2)), and evicts (e.g., deletes) key value 140(1) associated with hypervisor 120(1) and hierarchical fencing engine 130(1) from shared storage device 150 (e.g., <empty>).

In certain embodiments, after being triggered by and/or notified of the eviction of key value 140(1), hypervisor 120(1) updates itself upon receiving an I/O error as I/Os from node 110(2) are no longer honored by shared storage device 150. Hierarchical fencing engine 130(1) checks for a change in cluster membership and stops permitting I/Os for node 110(2), and re-registers with storage identifier 155 with an (updated and/or modified) key value 140(1) (e.g., 10001000). Key value 140(1) remains up-to-date (e.g., 10001000). Now, at this point in cluster membership, and according to certain other embodiments, if node 110(5) moves and/or is migrated from hypervisor 120(2) to hypervisor 120(1), hierarchical fencing engine 130(1) detects node 110(5) and because node 110(5) is a valid member of cluster 105, permits I/Os for node 110(5). Hierarchical fencing engine 130(2) then detects that node 110(5) has moved and/or has been migrated over to hypervisor 120(1) and updates its internal state without requiring a change in registration as node 110(5) is (still) a valid member of cluster 105 (e.g., based on key values 140(1) and 140(2)).

Therefore it will be appreciated that, hierarchical fencing engines 130(1) and 130(2) can perform I/O fencing (e.g., SCSI-3 PR-based fencing, and the like) for multiple nodes (e.g., multiple virtual machines) of a cluster running on a single host (e.g., a single hypervisor), while preventing I/O operations from a fenced off node on a per node basis, while maintaining access to other nodes on the same host. It will also be appreciated that hierarchical fencing engines 130(1) and 130(2) can preserve the identity and state of a given node, if that node is migrated from one host to another host in the cluster (e.g., the migrated node can remain part of the cluster). In addition, it should also be noted and appreciated that hierarchical fencing engines 130(1) and 130(2) as shown in FIGS. 1 and 2, besides other functionalities, provide tight data disk fencing (e.g., unlike CP server implementation), do not require end fiber channel switches, HBA adapters, and other such (physical) initiators to be N-Port ID (NPIV) aware, do not impose restrictions on the number of virtual initiator World Wide Numbers (WWNs) (e.g., virtual HBA WWNs) that a given initiator (e.g., a physical HBA) can support, and also do not require a WWN assignment authority and/or WWN management service.

Processes to Perform Hierarchical I/O Fencing in Clustered Environments

Figure 4:
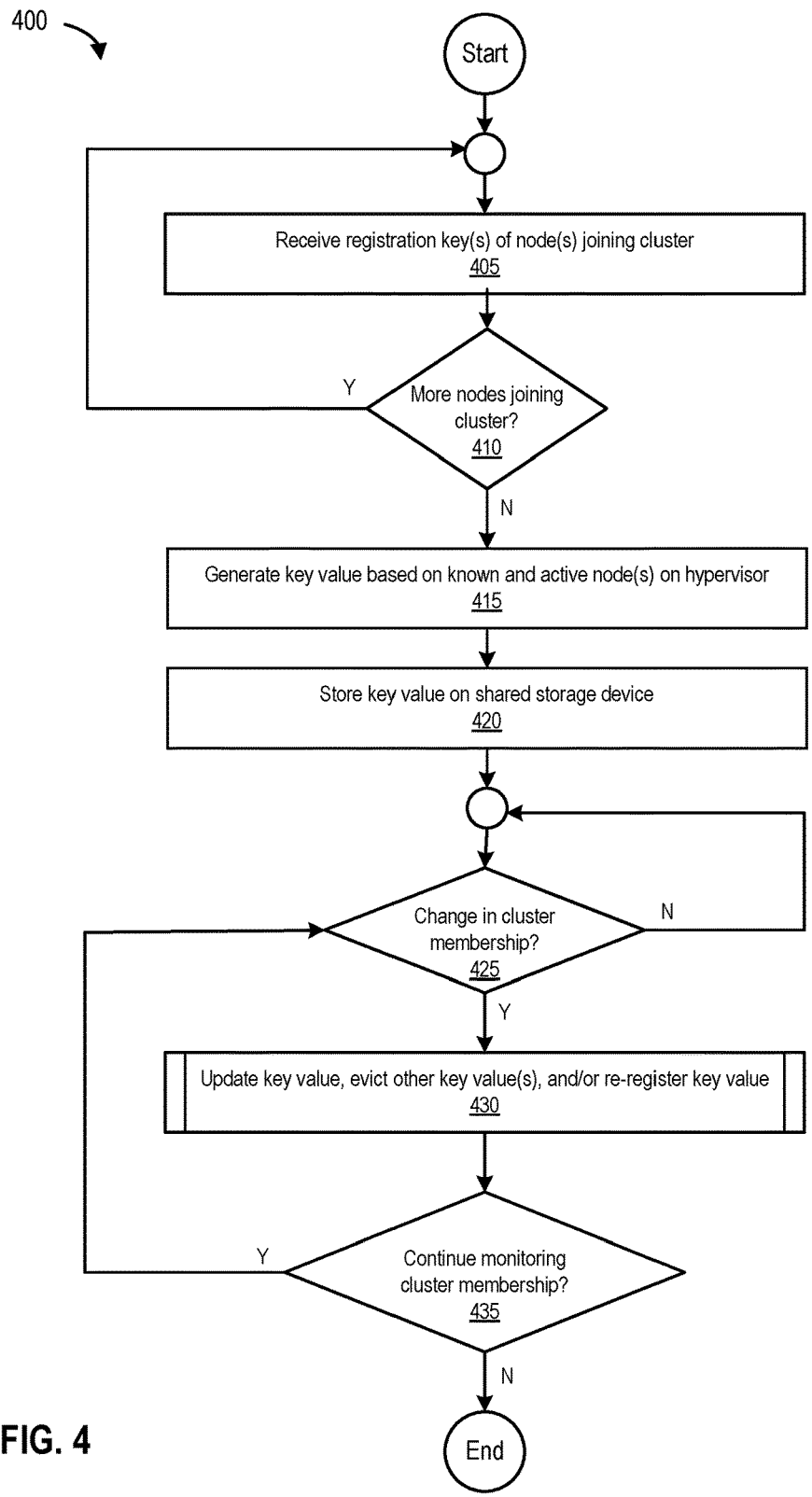
FIG. 4 is a flowchart 400 of a process for storing key values on a shared storage device, according to one embodiment of the present disclosure.

FIG. 4 is a flowchart 400 and illustrates a process for storing key values on a shared storage device, according to one embodiment. The process starts at 405 by receiving registration key(s) of nodes(s) joining a cluster (e.g., registration keys 135(1)-(4) and/or registration keys 135(5)-(8)). At 410, the process determines whether there are more nodes joining the cluster. If more nodes are joining the cluster, the process loops back to 405. If no more nodes are joining the cluster, the process, at 415, generates a key value based on known and active node(s) on a (given) hypervisor (e.g., key value 140(1)). At 420, the process stores the key value on a shared storage device (e.g., shared storage device 150 with storage identifier 155).

At 425, the process determines if there is a change in cluster membership. If there is no change in cluster membership, the process loops to 425. If there is a change in cluster membership, the process, at 430, updates the key value, evicts other key value(s), and/or re-registers an updated and/or modified key value (e.g., as discussed with respect to the examples in persistent reservation table 305 of FIG. 3). At 435, the process determines if there is a need to continue monitoring cluster membership. If there is a need to continue monitoring cluster membership, the process loops to 425. Otherwise, the process ends.

Figure 5:
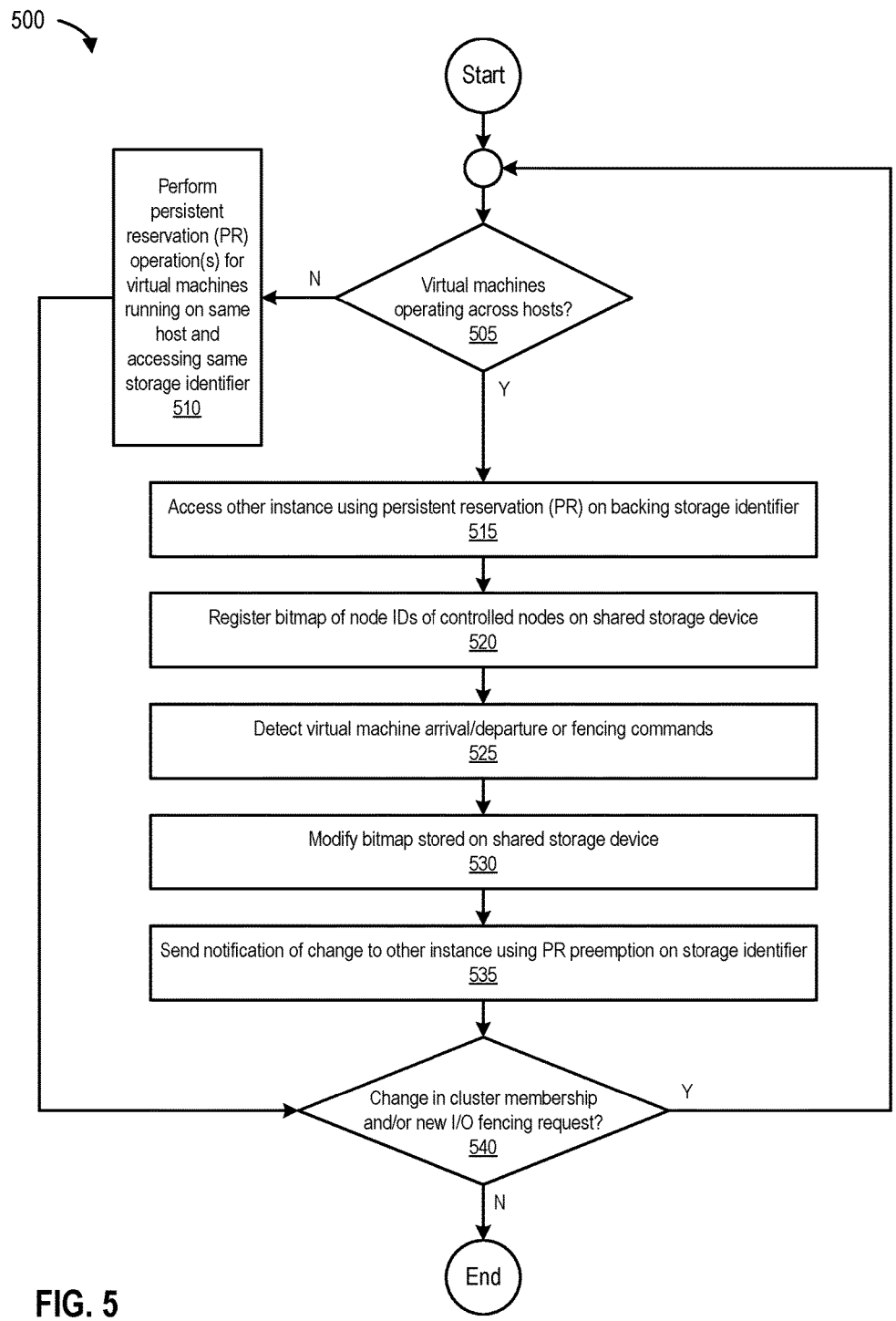
FIG. 5 is a flowchart 500 of a process for performing persistent reservation operations, according to one embodiment of the present disclosure.

FIG. 5 is a flowchart 500 and illustrates a process for performing persistent reservation operations, according to one embodiment. The process starts at 505 by determining if there are virtual machines (e.g., nodes) operating across hosts (e.g., across more than one hypervisor in a cluster). If there are no virtual machines operating across hosts, the process, at 510, performs persistent reservations operations for virtual machines running on the same host accessing the same storage identifier.

However, if there are virtual machines operating across hosts, the process, at 515, accesses the other instance (e.g., hierarchical fencing module 130(1) on hypervisor 120(1) accesses hierarchical fencing module 130(2) on hypervisor 120(2)) using persistent reservation on the backing storage identifier (e.g., storage identifier 155). At 520, the process registers (e.g., stores) a bitmap (e.g., key value 140(1)) of node IDs of controlled nodes on the shared storage device (e.g., on shared storage device 150).

At 525, the process detects virtual machine arrival/departure and/or fencing commands (e.g., register, un-register, reserve, preempt, and the like). At 530, the process modifies the bitmap stored on the shared storage device, and at 535, sends a notification of the modification, update, and/or change to the other instance using persistent reservation preemption on the storage identifier (e.g., via persistent reservation interface 225 as shown in FIG. 2). At 540, the process determines if there is a change in cluster membership and/or a new I/O fencing request. If there is a change in cluster membership and/or a new I/O fencing request, the process loops to 505. Otherwise, the process ends.

Figure 6:
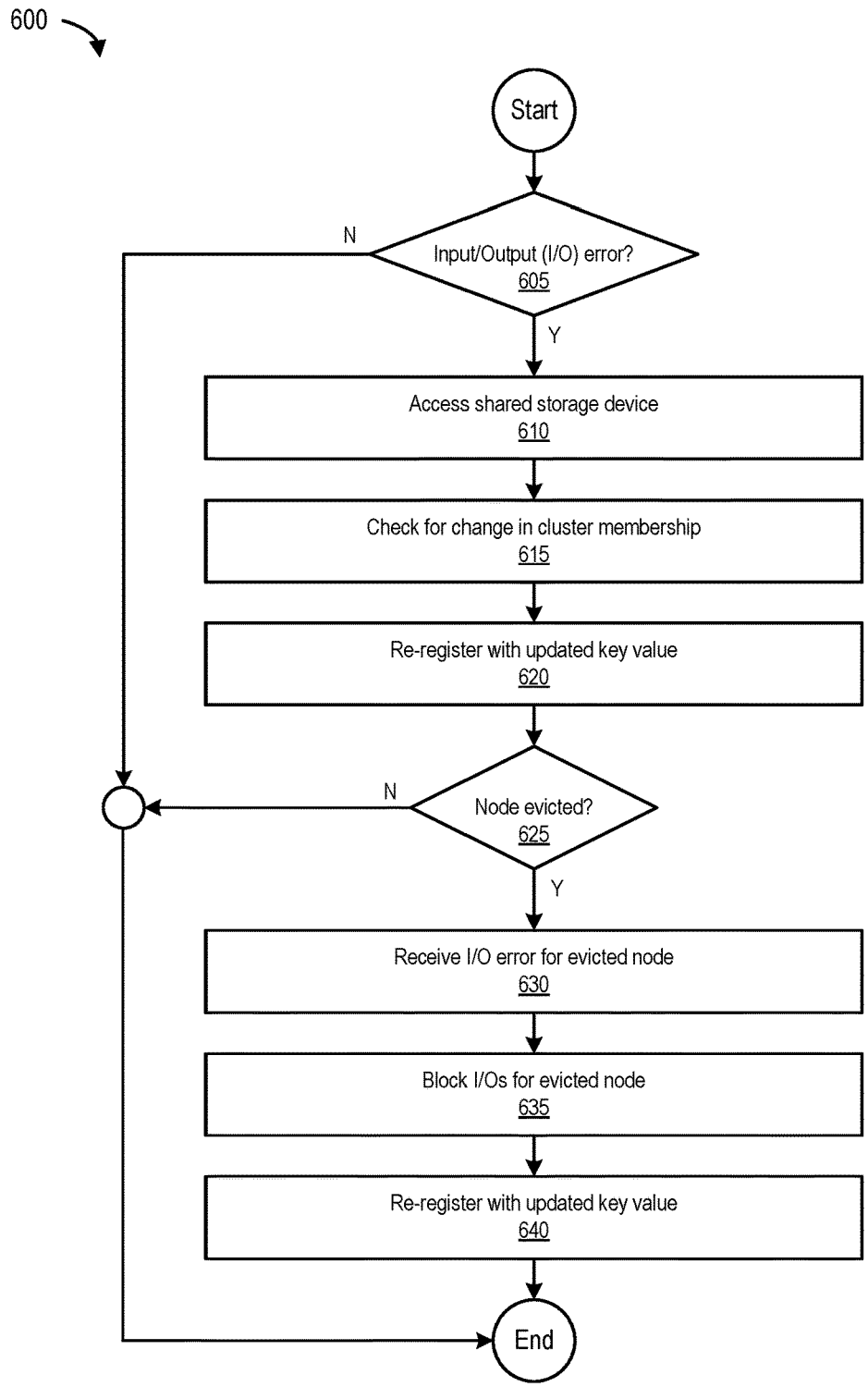
FIG. 6 is a flowchart 600 of a process for updating key values on a shared storage device, according to one embodiment of the present disclosure.

FIG. 6 is a flowchart 600 and illustrates a process for updating key values on a shared storage device, according to one embodiment. The process begins at 605 by determining if there are one or more I/O errors. If there are no I/O errors, the process ends. However, if there are I/O errors, the process at 610, access the shared storage device, and at 615, checks for a change in cluster membership (e.g., by evaluating key value(s) stored on the shared storage device). At 620, the process re-registers (with the storage identifier on the shared storage device) with an (updated) key value.

At 625, the process determines if a node has been evicted. If a node has not been evicted, the process ends. However, if a node has been evicted, the process, at 630, receives an I/O error for the evicted node, and at 635, blocks I/Os for the evicted node. The process ends at 640 by re-registering with the storage identifier and storing an (updated) key value on the shared storage device.

Figure 7:
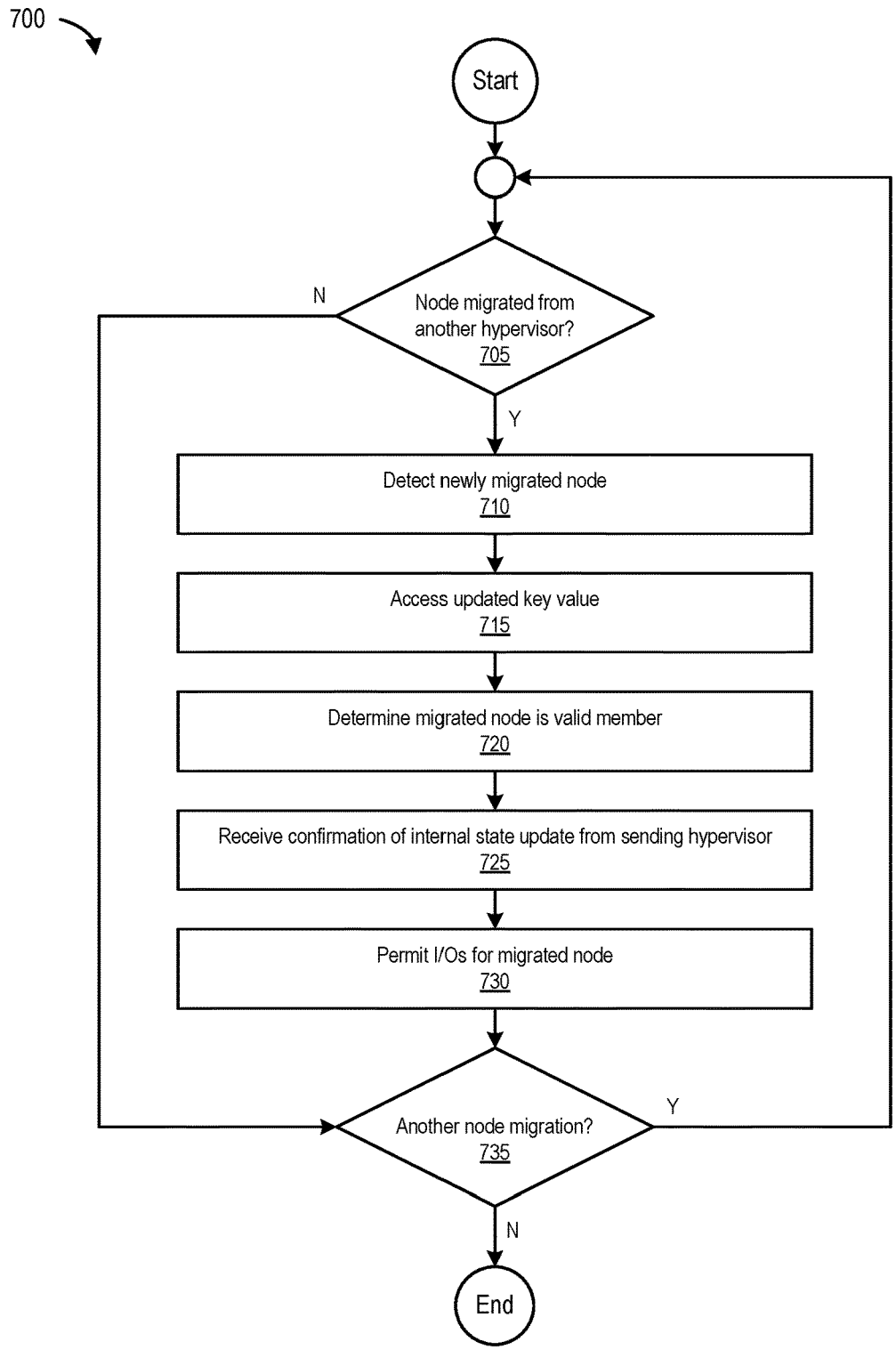
FIG. 7 is a flowchart 700 of a process for performing node migration in clustered environments, according to one embodiment of the present disclosure.

FIG. 7 is a flowchart 700 and illustrates a process for performing node migration in clustered environments, according to one embodiment. The process begins at 705 by determining if a node has migrated (or moved) from another hypervisor. If a node has not migrated from another hypervisor, the process ends. However, if a node has migrated from another hypervisor, the process, at 710, detects the newly migrated node, and at 715, accesses an updated key value (e.g., stored on the shared storage device).

At 720, the process determines if the migrated node is a valid member, and at 725, receives confirmation of an internal state update from the sending hypervisor (e.g., the another hypervisor from which the node has migrated). At 730, the process permits I/Os for the migrated node, and at 735, determines whether there is another node migration. If there is another node migration, the process loops to 705. Otherwise, the process ends.

Therefore, it will be appreciated that the processes of FIGS. 4, 5, 6, and 7 can perform hierarchical I/O fencing in clustered environments.

In some embodiments, a first hypervisor (e.g., hypervisor 120(1)) and a second hypervisor (e.g., hypervisor 120(2)) implement a first hierarchical fencing engine (e.g., hierarchical fencing engine 130(1)) and a second hierarchical fencing engine (e.g., hierarchical fencing engine 130(2)), respectively. In this example, a first key value (e.g., key value 140(1)) corresponds to one or more nodes executing on the first hypervisor (e.g., nodes 110(1)-(4)). The first hypervisor (e.g., hypervisor 120(1)) registers and/or stores the first key value on the shared storage device (e.g., shared storage device 150 with storage identifier 155 as shown in FIG. 1). In other embodiments, a second key value (e.g., key value 140(2)) registered and stored by a second hypervisor (e.g., hypervisor 120(2)) on shared storage device 150 is a combination of a bit wise OR of one or more existing nodes (executing and/or running) cluster 105 and one or more nodes executing on the second hypervisor. In this example, the second hypervisor (e.g., hypervisor 120(2)) removes and evicts the first key value (e.g., key value 140(1)) associated with the first hypervisor (e.g., hypervisor 120(1)) from shared storage device 150, and the removal and eviction of the first key value indicates (e.g., a notification) to the first hypervisor that cluster membership has changed. For example, the second hypervisor revokes/preempts/fences-off key value(s) of the first hypervisor to indicate a change in cluster membership.

In certain embodiments, the first hypervisor is configured to cause the second hypervisor to update the second key value by updating the first key value and revoking the second key value. In certain other embodiments, the second hypervisor is configured to cause the first hypervisor to update the first key value by updating the second key value and revoking the first value. In one embodiment, a node from the first set of nodes migrates from the first hypervisor to the second hypervisor, and in another embodiment another node from the second set of nodes migrates from the second hypervisor to the first hypervisor. For example, the ability to update one's own key value(s) stored on the shared storage device, and revoking, preempting, and/or fencing-off another hypervisor's key value(s) (e.g., causing the another hypervisor to update the another hypervisor's view of cluster membership) can be used to fence off nodes on the same hypervisor or on a different hypervisor. This mechanism also permits node migration from the first hypervisor to the second hypervisor, and vice-versa.

Example Computing Environment

Figure 8:
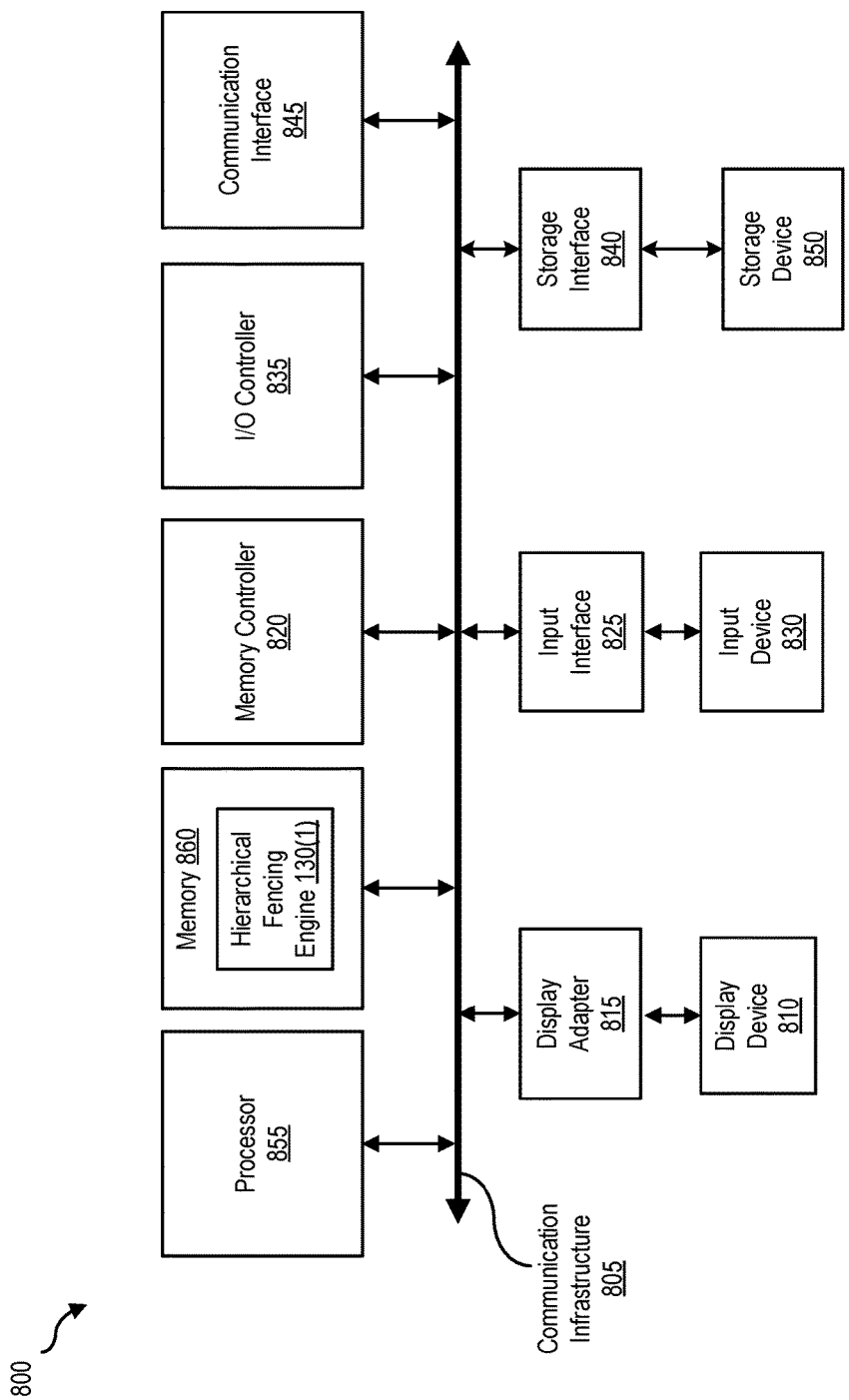
FIG. 8 is a block diagram 800 of a computing system, illustrating how a hierarchical fencing module can be implemented in software, according to one embodiment of the present disclosure.

FIG. 8 is a block diagram of a computing system, illustrating how a hierarchical fencing module can be implemented in software, according to one embodiment. Computing system 800 can include computing devices 115(1) and/or 115(2), and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes hierarchical fencing engines 130(1) and/or 130(2), computing system 800 becomes a special purpose computing device that is configured to perform hierarchical I/O fencing in clustered environments.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing hierarchical fencing engines 130(1) and/or 130(2) may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of an appliance and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850 and/or shared storage device 150. When executed by processor 855, a computer program loaded into computing system 800 may cause processor 855 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
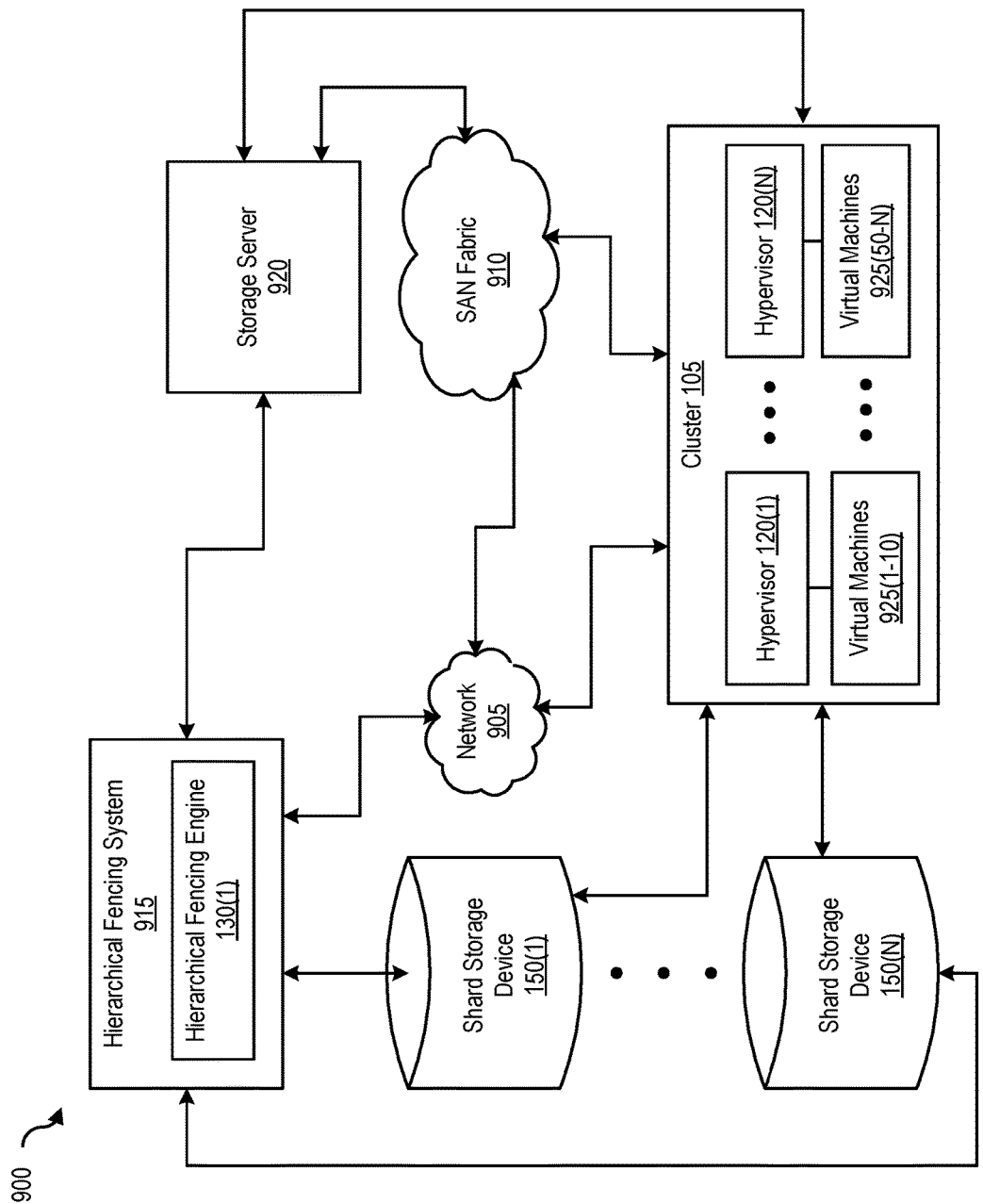
FIG. 9 is a block diagram of a networked system, illustrating how various computing devices can communicate via a network, according to one embodiment of the present disclosure.

FIG. 9 is a block diagram of a networked system, illustrating how various computing devices can communicate via a network, according to one embodiment. In certain embodiments, network-attached storage (NAS) devices may be configured to communicate computing devices 115(1) and/or 115(2), and/or hierarchical fencing system 915 using various protocols, such as Network File System (NFS), Server Message Block (SMB), or Common Internet File System (CIFS). Network 905 generally represents any type or form of computer network or architecture capable of facilitating communication between cluster 105, shared storage devise 150(1)-(N), and/or hierarchical fencing system 915.

In certain embodiments, a communication interface, such as communication interface 845 in FIG. 8, may be used to provide connectivity between cluster 105, shared storage devise 150(1)-(N), and/or hierarchical fencing system 915, and network 905. It should be noted that the embodiments described and/or illustrated herein are not limited to the Internet or any particular network-based environment. For example, network 905 can be a Storage Area Network (SAN). In some embodiments, hierarchical fencing system 915 may be part of computing devices 115(1) and/or 115(2), or may be separate. If separate, hierarchical fencing system 915 and computing devices 115(1) and/or 115(2) may be communicatively coupled via network 905.

In one embodiment, all or a portion of one or more of the disclosed embodiments may be encoded as a computer program and loaded onto and executed by computing devices 115(1) and/or 115(2), and/or hierarchical fencing system 915, or any combination thereof. All or a portion of one or more of the embodiments disclosed herein may also be encoded as a computer program, stored on computing devices 115(1) and/or 115(2), hierarchical fencing system 915, and/or shared storage devices 150(1)-(N), and distributed over network 905.

In some examples, all or a portion of computing devices 115(1) and/or 115(2), hierarchical fencing system 915, and/or shared storage devices 150(1)-(N) may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, hierarchical fencing engines 130(1) and/or 130(2) may transform the behavior of computing devices 115(1) and/or 115(2) in order to cause hypervisors 120(1) and/or 120(2) and/or shared storage device 150 to perform hierarchical I/O fencing in clustered environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   receiving a request to perform an input/output (I/O) fencing operation, wherein
   a first key value, generated from a first set of registration keys received from a first set of nodes of a cluster, is stored in a shared storage device,
   the first set of nodes are supported by a first hypervisor,
   the shared storage device is shared by the first set of nodes and a second set of nodes, and
   the second set of nodes are supported by a second hypervisor; and
   in response to receipt of the request,
   determining whether a node of the first set of nodes is subject to the I/O fencing operation, and
   in response to a determination that the node is subject to the I/O fencing operation,
   modifying the first key value by removing a key value associated with the node, and
   performing a persistent reservation operation on the node, wherein
   the persistent reservation operation comprises at least one of an unregister operation, a reserve operation, or a preempt operation.

2. The method of claim 1, further comprising:
   generating the first key value based, at least in part, on the first set of registration keys; and
   storing the first key value on the shared storage device.

3. The method of claim 1, further comprising:
  determining that a second node has joined the cluster, wherein
    the second set of nodes comprise the second node;
  determining that the second node joining the cluster has caused
    storing of a second key value in the shared storage device, and
    removal of the first key value from the shared storage device;
  determining whether the second node is subject to the I/O fencing operation; and
  in response to a determination that the second node is subject to the I/O fencing operation,
    performing one or more persistent reservation operations on the second node.

4. The method of claim 3, wherein
  the one or more persistent reservation operations comprise at least one of a register operation, an unregister operation, a reserve operation, or a preempt operation.

5. The method of claim 1, further comprising:
  determining whether a second node is subject to the I/O fencing operation, wherein the second set of nodes comprise the second node; and
  in response to a determination that the second node is subject to the I/O fencing operation, removing a second key value from the shared storage device, wherein the second key value is associated with the second set of nodes.

6. The method of claim 5, wherein
  the shared storage device is a Small Computer System Interface 3 (SCSI-3) storage device, and
  the first hypervisor and the second hypervisor access a Logical Unit Number (LUN) of the SCSI-3 disk as part of performing the persistent reservation operation.

7. The method of claim 1, wherein
  the first hypervisor and the second hypervisor implement a first hierarchical fencing engine and a second hierarchical fencing engine, respectively,
  the first key value corresponds to one or more nodes executing on the first hypervisor,
  a second key value corresponds to one or more nodes executing on the second hypervisor and is stored by the second hypervisor on the shared storage device,
  the removing the first key value indicates to the first hypervisor that the node is subject to the I/O fencing operation,
  the first hypervisor is configured to cause the second hypervisor to update the second key value, as a result of the first hypervisor updating the first key value, and
  the second hypervisor is configured to cause the first hypervisor to update the first key value, as a result of the first hypervisor updating the second key value.

8. A non-transitory computer readable storage medium comprising program instructions that, when executed by one or more processors of a computing system, are configured to cause at least one of the one or more processors to:
  receive a request to perform an input/output (I/O) fencing operation, wherein
    a first key value, generated from a first set of registration keys received from a first set of nodes of a cluster, is stored in a shared storage device,
    the first set of nodes are supported by a first hypervisor,
    the shared storage device is shared by the first set of nodes and a second set of nodes, and
    the second set of nodes are supported by a second hypervisor; and
  in response to receipt of the request,
    determine whether a node of the first set of nodes is subject to the I/O fencing operation, and
    in response to a determination that the node is subject to the I/O fencing operation,
      modify the first key value by removing a key value associated with the node, and
      perform a persistent reservation operation on the node, wherein
        the persistent reservation operation comprises at least one of an unregister operation, a reserve operation, or a preempt operation.

9. The non-transitory computer readable storage medium of claim 8, wherein the program instructions further comprise program instructions that, when executed by the one or more processors, are configured to cause at least one of the one or more processors to:
  generate the first key value based, at least in part, on the first set of registration keys; and
  store the first key value on the shared storage device.

10. The non-transitory computer readable storage medium of claim 8, wherein the program instructions further comprise program instructions that, when executed by the one or more processors, are configured to cause at least one of the one or more processors to:
  determine that a second node has joined the cluster, wherein
    the second set of nodes comprise the second node;
  determine that the second node joining the cluster has caused
    storing of a second key value in the shared storage device, and
    removal of the first key value from the shared storage device;
  determine whether the second node is subject to the I/O fencing operation; and
  in response to a determination that the second node is subject to the I/O fencing operation,
    perform one or more persistent reservation operations on the second node.

11. The non-transitory computer readable storage medium of claim 10, wherein
  the one or more persistent reservation operations comprise at least one of a register operation, an unregister operation, a reserve operation, or a preempt operation.

12. The non-transitory computer readable storage medium of claim 8, wherein the program instructions further comprise program instructions that, when executed by the one or more processors, are configured to cause at least one of the one or more processors to:
  determine whether a second node is subject to the I/O fencing operation, wherein the second set of nodes comprise the second node; and
  in response to a determination that the second node is subject to the I/O fencing operation, remove a second key value from the shared storage device, wherein the second key value is associated with the second set of nodes.

13. The non-transitory computer readable storage medium of claim 12, wherein
  the shared storage device is a Small Computer System Interface 3 (SCSI-3) storage device, and
  the first hypervisor and the second hypervisor access a Logical Unit Number (LUN) of the SCSI-3 disk as part of performing the persistent reservation operation.

14. The non-transitory computer readable storage medium of claim 8, wherein the first hypervisor and the second hypervisor implement a first hierarchical fencing engine and a second hierarchical fencing engine, respectively, the first key value corresponds to one or more nodes executing on the first hypervisor, a second key value corresponds to one or more nodes executing on the second hypervisor and is stored by the second hypervisor on the shared storage device, removal of the first key value indicates to the first hypervisor that the node is subject to the I/O fencing operation, the first hypervisor is configured to cause the second hypervisor to update the second key value, as a result of the first hypervisor updating the first key value, and the second hypervisor is configured to cause the first hypervisor to update the first key value, as a result of the first hypervisor updating the second key value.

15. A system comprising:

one or more processors; and a memory coupled to the one or more processors, wherein the memory stores program instructions that, when executed by the one or more processors, are configured to cause at least one of the one or more processors to receive a request to perform an input/output (I/O) fencing operation, wherein a first key value, generated from a first set of registration keys received from a first set of nodes of a cluster, is stored in a shared storage device, the first set of nodes are supported by a first hypervisor, the shared storage device is shared by the first set of nodes and a second set of nodes, and the second set of nodes are supported by a second hypervisor, in response to receipt of the request, determine whether a node of the first set of nodes is subject to the I/O fencing operation, and in response to a determination that the node is subject to the I/O fencing operation, modify the first key value by removing a key value associated with the node, and perform a persistent reservation operation on the node, wherein the persistent reservation operation comprises at least one of an unregister operation, a reserve operation, or a preempt operation.

16. The system of claim 15, wherein the program instructions further comprise program instructions executable that, when executed by the one or more processors, are configured to cause the at least one of the one or more processors to:

generate the first key value based, at least in part, on the first set of registration keys; and store the first key value on the shared storage device.

17. The system of claim 15, wherein the program instructions further comprise program instructions that, when executed by the one or more processors, are configured to cause the at least one of the one or more processors to:

determine that a second node has joined the cluster, wherein the second set of nodes comprise the second node;

determine that the second node joining the cluster has caused storing of a second key value in the shared storage device, and removal of the first key value from the shared storage device;

determine whether the second node is subject to the I/O fencing operation; and in response to a determination that the second node is subject to the I/O fencing operation, perform one or more persistent reservation operations on the second node.

18. The system of claim 17, wherein the one or more persistent reservation operations comprise at least one of a register operation, an unregister operation, a reserve operation, or a preempt operation.

19. The system of claim 15, wherein the program instructions further comprise program instructions executable that, when executed by the one or more processors, are configured to cause at least one of the one or more processors to:

determine whether a second node is subject to the I/O fencing operation, wherein the second set of nodes comprise the second node; and in response to a determination that the second node is subject to the I/O fencing operation, remove a second key value from the shared storage device, wherein the second key value is associated with the second set of nodes.

20. The system of claim 19, wherein the shared storage device is a Small Computer System Interface 3 (SCSI-3) storage device, and the first hypervisor and the second hypervisor access a Logical Unit Number (LUN) of the SCSI-3 disk as part of performing the persistent reservation operation.

21. The system of claim 15, wherein the first hypervisor and the second hypervisor implement a first hierarchical fencing engine and a second hierarchical fencing engine, respectively, the first key value corresponds to one or more nodes executing on the first hypervisor, a second key value corresponds to one or more nodes executing on the second hypervisor and is stored by the second hypervisor on the shared storage device, removal of the first key value indicates to the first hypervisor that the node is subject to the I/O fencing operation, the first hypervisor is configured to cause the second hypervisor to update the second key value, as a result of the first hypervisor updating the first key value, and the second hypervisor is configured to cause the first hypervisor to update the first key value, as a result of the first hypervisor updating the second key value.

* * * * *